Jan. 24, 1961
H. K. NEUMANN
2,969,038
FLUIDIZED BED APPARATUS
Filed March 5, 1958
2 Sheets-Sheet 1
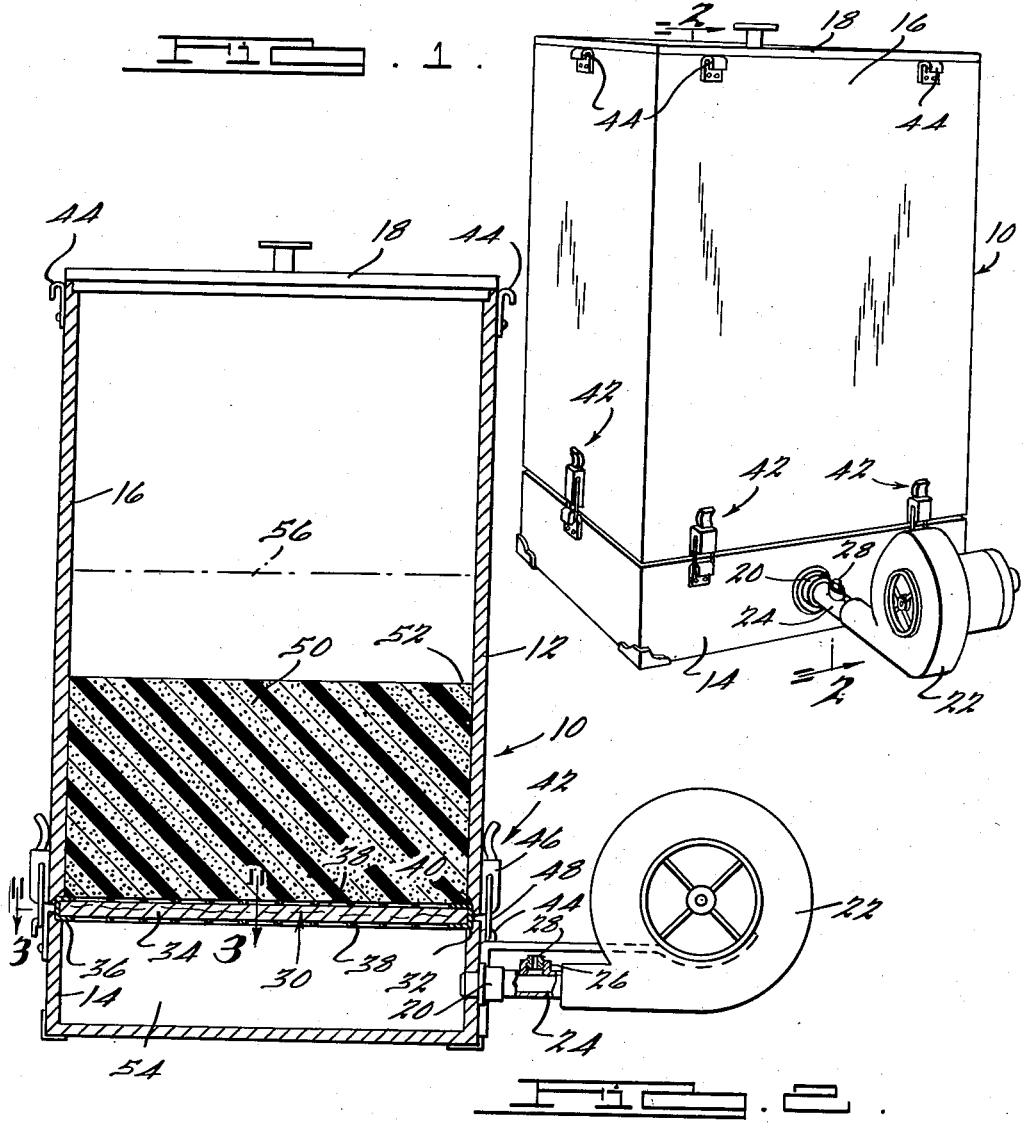
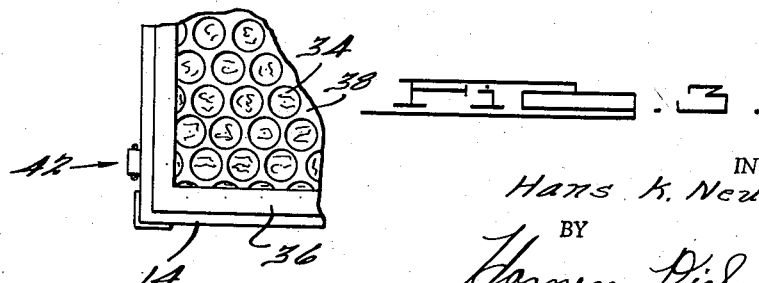
INVENTOR.
Hans K. Neumann.
BY
Harness, Dickey & Pierce
ATTORNEYS.

Jan. 24, 1961
H. K. NEUMANN
2,969,038
FLUIDIZED BED APPARATUS
Filed March 5, 1958
2 Sheets-Sheet 2
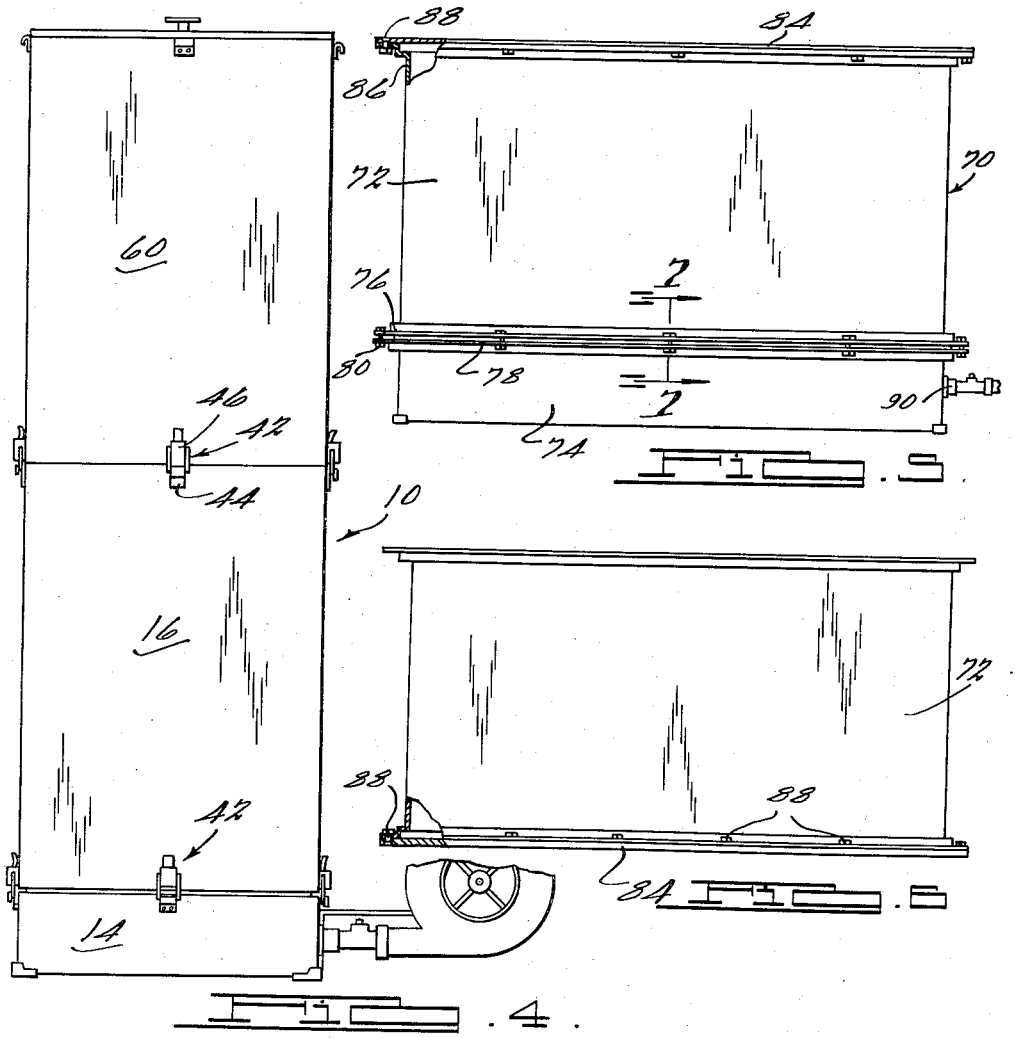
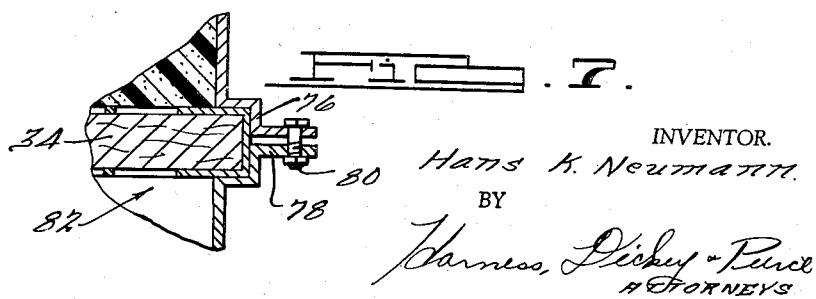
INVENTOR.
Hans K. Neumann
BY
Harness, Dickey & Pierce
ATTORNEYS

United States Patent Office 2,969,038
Patented Jan. 24, 1961

2,969,038

FLUIDIZED BED APPARATUS

Hans K. Neumann, Detroit, Mich., assignor to Michigan Chrome and Chemical Company, a corporation of Michigan Filed Mar. 5, 1958, Ser. No. 719,386

4 Claims. (Cl. 118—429)

This invention relates generally to fluidizing apparatus for suspending powder particles in a gaseous stream and more particularly to a fluidized bed or conveyor apparatus.

A well known type of coating apparatus consists of a fluidized or rarified bed of finely divided coating material into which a pre-heated article to be coated is dipped. The fluidization of the coating material is achieved by providing an ascending current of gas or air in a tank containing the coating material in the form of a specially ground powder. The article to be coated is preheated to a temperature above the melting point of the coating powder and then immersed for a time period which varies depending on the desired thickness of the coating. When the article to be coated is introduced into the fluidized bed, the pulverized plastic sinters together on the hot surface of the article and forms a coherent coating which is free from pores and tears. By a proper selection of a coating material, a wide range of products such as metals, ceramics, wood, glass, plastics and the like can be coated.

In order to obtain a uniform distribution of the powder in the ascending air stream, the powder particles must be of a correct size and shape. The particles must be of a somewhat spherical shape, as contrasted with a fiber-like shape, so that they are easily separated and they must be light enough to ascend in the air stream while being heavy enough to preclude their being blown out of the container for the powder. In practice, it has been found that a uniform particle size provides the best fluidized bed. In general, the coating material can be any substance which can be powdered and which will melt sufficiently below its degradation point. Examples of suitable coatings are vinyl, poly-olefin, nylon, epoxy, phenolic and cellulosic resins, chlorinated polyethers and polycarbonates.

In a fluidized conveyor apparatus the gaseous stream with the suspended particles therein is moved in a horizontal direction so as to transport the particles from one place to another. These conveyors are used for transporting material such as cement, flour and the like. The most critical requirement of the apparatus, whether it is used to provide a bed or for conveying, is that it provide for an ascending air stream which has all of its portions moving at substantially the same velocity. A uniform dispersion of particles is insured if the ascending air stream has this characteristic and is without any channelling of the air moving through the bed. The critical part in any apparatus, therefore, is the dispersion unit through which the gas is forced from one side to provide the fluidizing stream on the other side.

The principal object of this invention, therefore, is to provide an improved fluidizing apparatus in which the powder particles are uniformly dispersed throughout the bed.

Another object is to provide a dispersion unit for fluidizing apparatus which is simple in construction, readily purchased at an economical cost and is of uniform permeability.

A further object of this invention is to provide an improved fluidized bed apparatus which is simple in construction, economical to manufacture, and efficient in operation in providing for a uniform coating of articles immersed therein.

Further objects, features and advantages of this invention will become apparent from a consideration of the following description, the appended claims and the accompanying drawing in which:

Figure 1 is a perspective view of the fluidized bed apparatus of this invention;

Fig. 2 is an enlarged vertical sectional view looking along the line 2—2 in Fig. 1;

Fig. 3 is a fragmentary sectional view looking substantially along the line 3—3 in Fig. 2;

Fig. 4 is a side elevational view of the apparatus of this invention showing the powder container or tank provided with a vertical extension;

Fig. 5 is a side elevational view of a modified form of container used in the apparatus of this invention;

Fig. 6 is a view of the top portion of the container illustrated in Fig. 5 shown in an inverted position; and Fig. 7 is an enlarged fragmentary view looking along the line 7—7 in Fig. 5.

With reference to the drawing, the fluidized bed apparatus of this invention, indicated generally at 10, is illustrated in Fig. 1 as including an upright container 12 having a lower section 14, an upper section 16 and a cover 18. The lower section 14 carries a fitting 20 which adapts the container 12 for connection to a suitable blower 22. A connecting pipe 24 which extends between the container connection 20 and the blower 22 has an internally threaded laterally extending exhaust tube portion 26. Plug-like adapters, like the one shown at 28, are threaded into the tube portion 26 to regulate the amount of air exhausted from the connecting pipe 24 for a purpose to appear presently.

An air diffusion or distributing unit 30 is supported on an internal shoulder 32 on the lower section 14. The unit 30 consists of a plate 34 formed in a preferred form of the invention of a fiberboard material such as the "Nu-Wood" industrial board marketed by the Wood Conversion Company of St. Paul, Minnesota. This material is a fiberboard made by felting clean, new wood fibers under pressure. It has the requisite porosity or permeability and is sufficiently uniform to provide the required ascending air stream which has all of its horizontally aligned portions moving at substantially the same velocity, when air under pressure is applied to the underside of the plate 34. The plate 34 may also be formed of a board fabricated from coarse wood chips such as the "Granite Board" industrial board marketed by National Starch Products, Inc. of New York, New York. This board is readily obtained in the required size and is of a porosity or permeability sufficiently uniform to provide satisfactory results in a fluidizing apparatus.

A seal member 36 formed of a resilient material such as plastisol extends completely around the plate 34 and perforated metal sheets 38 are arranged on the top and bottom sides of the plate 34 for protecting the plate against gouging or scoring during handling and use. As shown in Fig. 3, the openings in a sheet 38 are closely spaced so that the sheet in effect covers a very small portion of the total area of the plate 34. The sheets 38 are not essential to the operation of the apparatus 10 and can be omitted if desired.

The upper section 16 has an open lower end provided with a horizontal shoulder 40 supported on the seal member 36 for the diffusion unit 30 as shown in Fig. 2. A plurality of lock assemblies 42 located on all four sides of the container 12 are operable to connect the lower and upper sections 14 and 16, respectively, so that the diffusion unit 30 is securely clamped between the shoulders 32 and 40. Each lock assembly 42 consists of a hook 44 on the lower section 14 and a pivoted handle 46 on the upper section 16 having a depending loop 48 of a shape to engage the hook 44. On upward swinging of the handle 46 to a position against the container 12, the loop 48 pulls the sections 14 and 16 toward each other to securely clamp the diffusion unit 30 between the shoulders 32 and 40. On downward swinging of the handle 46 to a substantially horizontal position, the loop 48 is readily disengaged from the hook 44.

In the operation of the apparatus 10, the sections 14 and 16 are assembled as shown in Figs. 1 and 2, the cover 18 is removed, and a coating powder 50 is deposited in the section 16 to the level indicated at 52 in Fig. 2. The powder, as previously described, may be any plastic powder of correct particle size and shape that has a melting point below its degradation point and which will fluidize in an ascending air stream.

The blower 22 is started so that air is continually delivered to the chamber 54 formed in the lower container section 14 below the diffusion unit 30. An air pressure is thus developed in the chamber 54, the magnitude of which is determined by the size of the adapter plug 28 in the connecting pipe 24 between the blower 22 and the chamber 54. This air pressure in the chamber 54 creates a total upward force on the air moved through the plate 34 which is equal to the resistance of the fiberboard plate 34 to flow of air therethrough, plus the weight of the powder 50, plus the frictional force of the powder particles on the ascending air stream in the upper container section 16 plus the atmospheric pressure. This air pressure in the chamber 54 provides an ascending air stream in the container section 16 which is of low velocity by virtue of the high obstruction to air passage presented by the fiberboard plate 34. This characteristic of the plate 34 also provides for the buildup of the necessary air pressure in the chamber 54. For different plastic coating materials 50, different adapter plugs 28 are used in the connecting pipe 24 to adapt the pressure in the chamber 54 to the particular powder being used.

Articles to be coated are heated to temperatures above the melting point of the fluidized powder 50 which, when dispersed in the ascending air stream, rises to approximately the level indicated at 56. The article to be coated is then immersed in the fluidized powder 50 so that the powder particles sinter together on the hot surface of the article.

As best appears in Fig. 4, the height of the container 12 is readily extended by supporting a container extension section 60 on the upper section 16. The extension section 60 is substantially identical to the section 16 and has handle sections 46 for lock units 42 which coact with hook sections 44 at the upper end of the upper section 16. Consequently, when coating articles which are too long to be coated in the container 12 with only the upper section 16, the extension section 60 is readily supported on the upper end of the upper section 16 to provide a powder container of the requisite length.

When different coating operations require different powders, or in some instances, require the use of powders of different colors, the powder from one operation must be removed from the container 12 before the second powder can be deposited in the container. In such cases, the container sections 14 and 16 are disconnected and the diffussion unit 30 is removed for cleaning with an air blast or the like.

To facilitate the removal and storage of the powder 50, a container like the one indicated at 70 in Fig. 5 may be utilized. The container 70 includes upper and lower sections 72 and 74, respectively, having opposed flanges 76 and 78 connected by bolts 80 so as to clamp an air diffusion unit 82, like the unit 30 previously described, between the flanges. A cover 84 for the container 70 is adapted to be removably connected to the end 86 of the container section 72 by bolts 88. The lower container section 74 has a connector 90 which adapts the lower section 74 for connection to a blower like the blower 22, in the manner previously described in connection with the container 12.

When the powder in the container 70 is to be changed, following a coating operation, the cover 84 is secured to the upper section 72 and the container 70 is inverted. The lower container section 74 is then removed from the upper section 72 so that the top 84 functions as a bottom for a powder receptacle, as illustrated in Fig. 6. The container top section 72 thus functions as a storage receptacle for the powder until it is to be used again. A second top section is then assembled with the lower section 74, as illustrated in Fig. 5, after the air diffusion unit 82 has been cleaned.

From the above description it can be seen that the apparatus 10 of this invention provides a fluidized bed in which the powder particles are uniformly dispersed in the container 12. Accordingly, a uniform coating on articles immersed in the container 12 can be relied upon. These superior results are achieved by virtue of the fiber construction of the plate 34 which provides for a very high resistance to travel of air through the plate while permitting passage of sufficient air at low velocity to form the necessary fluidizing air stream. Any suitable felted and/or compressed board, formed of cellulosic, mineral and/or synthetic fibers, with or without binders and having these characteristics, such as "Nu-Wood" and "Granite Board," can be satisfactorily used in the plate 34. This board can be readily obtained at most lumber yards in large sheets and is referred to herein generically as "fiberboard." Regardless of whether or not one or more extension sections 60 are used, the diffusion plate 30 is located in the container between the upper end thereof, namely, the upper end of the upper section 16 or 60, and the lower end thereof, namely, the bottom wall of the lower section 14.

The fluidized conveyor is similar to the apparatus 10, differing only in that the conveyor has a horizontal length corresponding to the distance the particular powder is to be transported, and is, therefore, not illustrated. The conveyor is open at its ends and may be provided with a permanent cover.

A conveyor constructed according to this invention has a fiberboard diffusion unit like the unit 30 and is, therefore, economical and easy to construct by virtue of the low cost and availability of the fiberboard and efficient in operation because of the uniform permeability of the fiberboard.

It will be understood that the specific constructions of the improved fluidizing apparatus or similar apparatus for suspending powder particles in a gaseous stream which are herein disclosed and described are presented for purposes of explanation and illustration and are not intended to indicate limits of the invention, the scope of which is defined by the following claims.

What is claimed is:

1. Apparatus for suspending powder particles in a gaseous stream comprising a container having a gas diffusion plate mounted between the upper and lower ends thereof so as to divide the container into an upper powder containing section and a lower section adapted to communicate with a source of gas under a pressure sufficient to force said gas upwardly through said plate, said plate consisting of a fiberboard member formed of compressed fibers and which is of a uniform permeability such that a uniform low velocity gas stream will flow upwardly therethrough.

2. Fluidized bed apparatus comprising a vertically extending container having separable upper and lower sections, said lower section having a horizontal shoulder formed thereon below the upper end thereof, a gas diffusion unit including a plate member formed of a fiberboard material which is of a uniform permeability such that a uniform low velocity gas stream will flow upwardly therethrough and a resilient seal member mounted on and extending about said plate member, said seal member resting on said shoulder and being of a thickness to extend above the upper end of said lower section, said upper section being supported on said seal member, and coacting means on said sections for connecting the sections so that the diffusion unit is clamped therebetween.

3. Fluidized bed apparatus comprising a container having a gas diffusion plate formed of a fiberboard material which is of a uniform permeability such that a uniform low velocity gas stream will flow upwardly therethrough mounted between the upper and lower ends thereof so as to divide said container into an upper powder containing section and a lower section adapted to communicate with a source of gas under a pressure sufficient to force said gas upwardly through said plate, and an extension section mounted on and releasably secured to the upper end of the upper section.

4. Apparatus for suspending powder particles in a gaseous stream comprising a container having separable upper and lower sections, a gas diffusion plate supported on the upper end of the lower section, said diffusion plate consisting of board member formed of compressed wood fibers and which is of a uniform permeability such that a uniform low velocity gas stream will flow therethrough when gas under pressure is supplied to one side thereof, said upper section extending upwardly from said plate member, and coacting means on said sections for connecting the sections so that the diffusion unit is maintained in a stationary position.

References Cited in the file of this patent

UNITED STATES PATENTS

| | | |
|---|---|---|
| 1,453,255 | Poppert | Aug. 30, 1923 |
| 1,695,995 | Coulston | Dec. 18, 1928 |
| 2,277,824 | Franson | Mar. 31, 1942 |
| 2,750,064 | Clarke | June 12, 1956 |
| 2,795,318 | Morris | June 11, 1957 |
| 2,802,405 | Krogel | Aug. 13, 1957 |
| 2,824,723 | Turney et al. | Feb. 25, 1958 |
| 2,844,489 | Gemmer | July 22, 1958 |

FOREIGN PATENTS

| | | |
|---|---|---|
| 759,214 | Great Britain | Oct. 17, 1956 |

OTHER REFERENCES

Cline et al.: "Journal of the Electrochemical Society," vol. 98, No. 10, October 1951, pp. 385–387 (Fluid Bed Digest).